Jan. 21, 1936.   C. M. F. FRIDEN   2,028,540
CALCULATING MACHINE
Original Filed Feb. 27, 1922   6 Sheets-Sheet 1

WITNESS
H. Sherburne

INVENTOR
CARL M. F. FRIDEN
BY
White, Prost & Evans
his ATTORNEYS

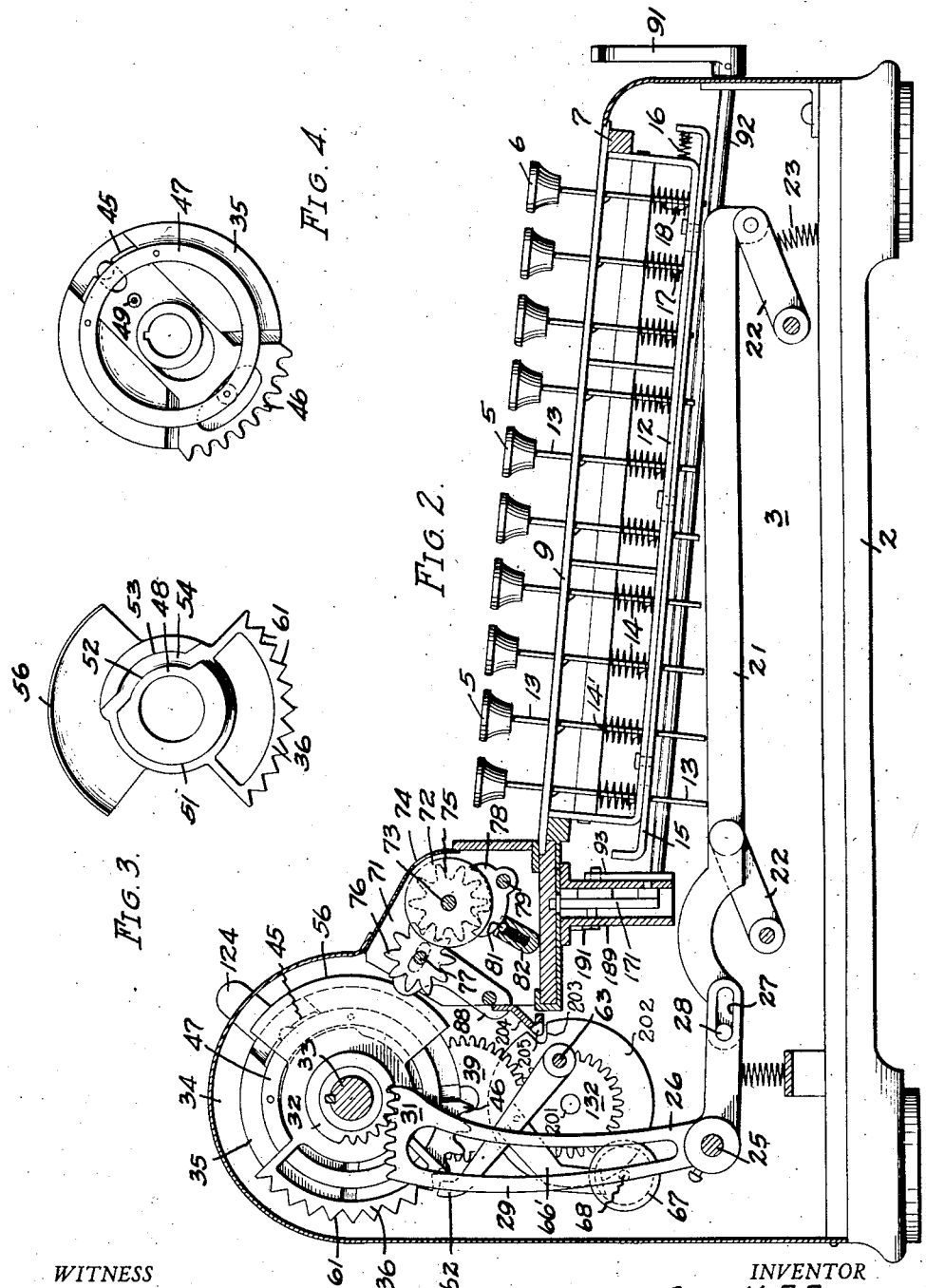

Jan. 21, 1936.　　　　C. M. F. FRIDEN　　　　2,028,540

CALCULATING MACHINE

Original Filed Feb. 27, 1922　　6 Sheets-Sheet 3

WITNESS
H. Sherburne

INVENTOR
CARL M. F. FRIDEN.
BY
White Prat Evans
his ATTORNEYS

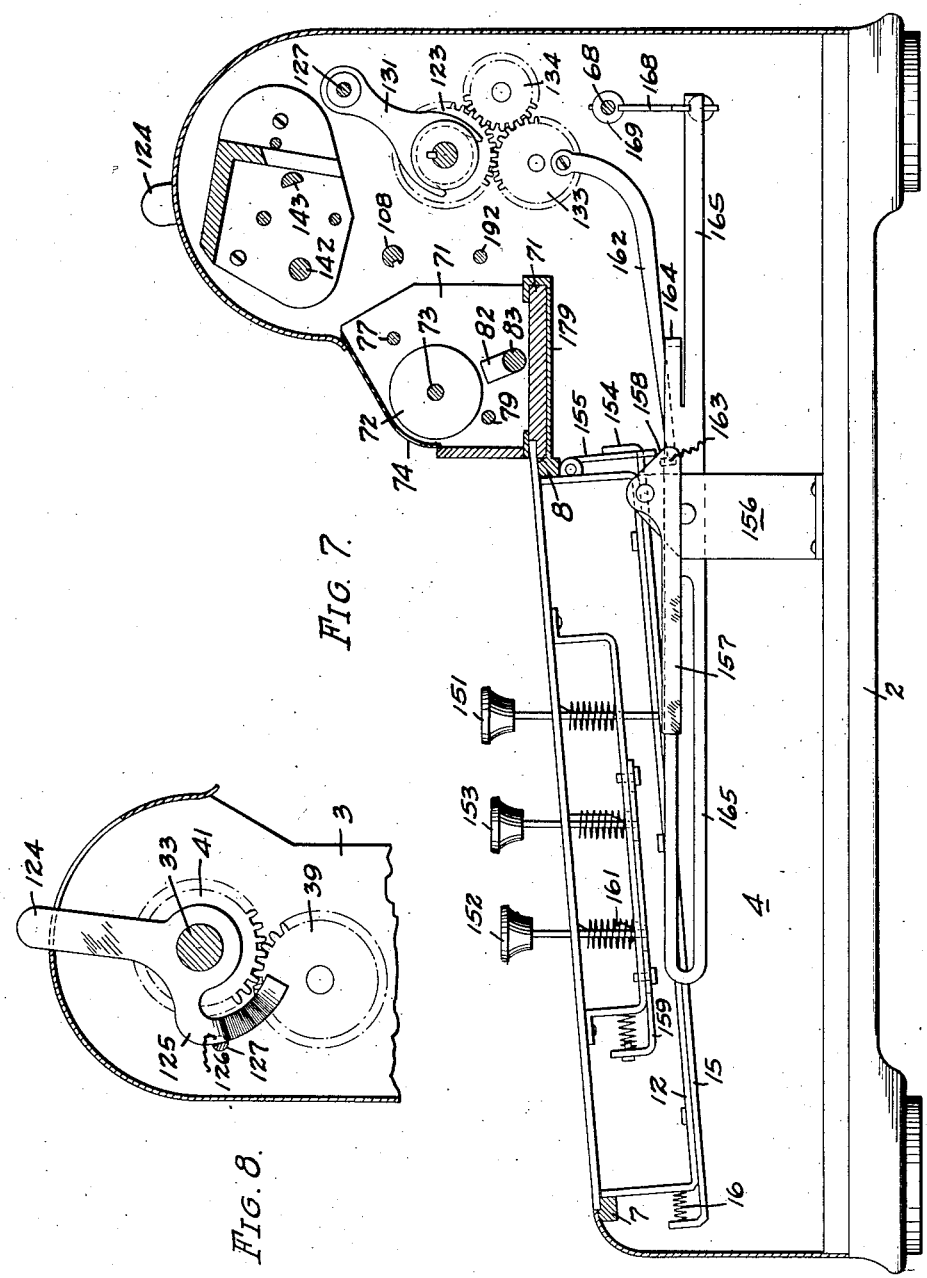

Jan. 21, 1936.   C. M. F. FRIDEN   2,028,540
CALCULATING MACHINE
Original Filed Feb. 27, 1922   6 Sheets-Sheet 5
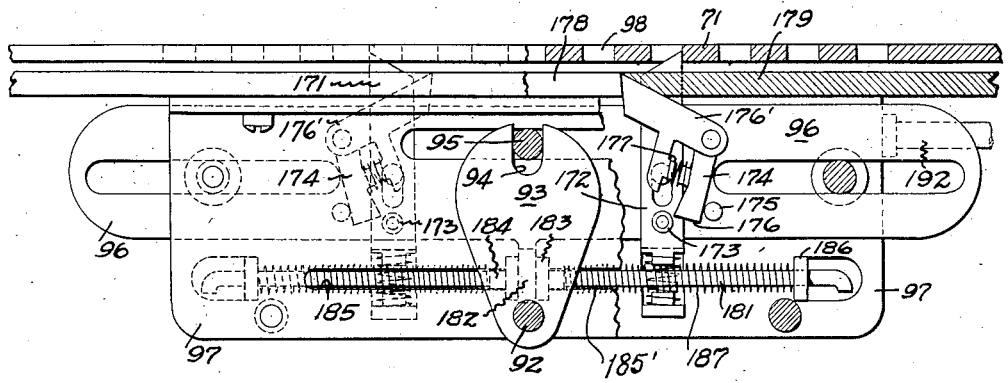
Fig. 9.
Fig. 10.
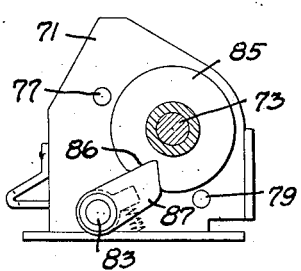
Fig. 11.
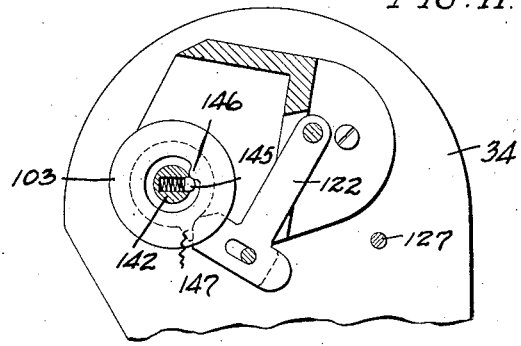
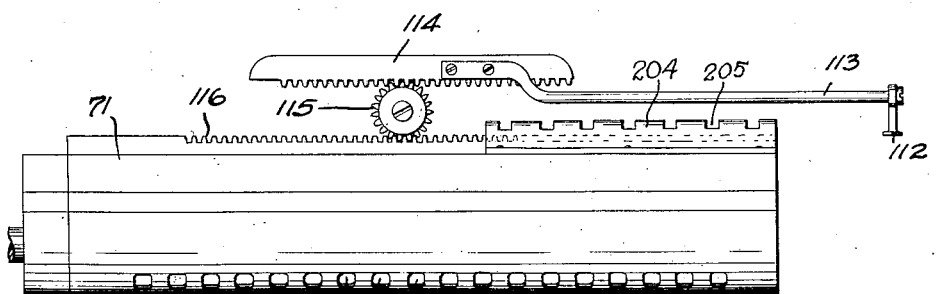
Fig. 12.
WITNESS
H. Sherburne
INVENTOR
CARL M. F. FRIDEN.
BY White Prost Evans
his ATTORNEYS Jan. 21, 1936.  C. M. F. FRIDEN  2,028,540

CALCULATING MACHINE

Original Filed Feb. 27, 1922   6 Sheets-Sheet 6

WITNESS
H. Sherburne

INVENTOR
CARL M. F. FRIDEN.
BY
White Prost Evans
his ATTORNEYS

Patented Jan. 21, 1936

2,028,540

UNITED STATES PATENT OFFICE 2,028,540

CALCULATING MACHINE

Carl M. F. Friden, Piedmont, Calif., assignor to Marchant Calculating Machine Company, Emeryville, Calif., a corporation of California Application February 27, 1922, Serial No. 539,422
Renewed August 9, 1933

8 Claims. (Cl. 235—73)

The invention relates to calculating machines and particularly to machines of the type wherein the values to be calculated are introduced into the machine by the depression of numeral keys.

An object of the invention is to produce a simple, accurate and durable calculating machine of the key-board type.

Another object of the invention is to produce a key-board machine in which the pressure required to depress the keys is reduced to a minimum.

Another object of the invention is to produce a key-board machine in which the depression of a key positions a selecting element, which upon operation of the machine, positions the actuating element to perform the calculation.

A further object of the invention is to produce a calculating machine of the key-board type which may be enlarged to any capacity by the addition of duplicate parts.

A further object of the invention is to provide a calculating machine which will perform the various calculating operations with a minimum number of operative movements.

The invention possesses many other advantageous features, some of which, with the foregoing, will be set forth at length in the following description where I shall outline in full, that form of the invention which I have selected for illustration in the drawings accompanying and forming part of the present specification. In said drawings I have shown one embodiment of my invention, but it is to be understood that I do not limit myself to such form, since the invention, as set forth in the claims, may be embodied in a plurality of forms.

Referring to said drawings:—

Fig. 2 is a longitudinal vertical section of the machine taken through the counter actuating mechanism, taken on the line 2—2, Fig. 5.

Fig. 3 is a side elevation of a value selecting element.

Fig. 4 is a side elevation of a counter actuating unit.

Fig. 7 is a vertical section taken on the line 7—7, Fig. 5.

Fig. 8 is a vertical section showing the reversing actuating mechanism.

Fig. 9 is an elevation, partly in section, of the carriage shifting mechanism.

Fig. 10 is an end view of the carriage with the end plate removed, showing the means for holding the counting wheel shaft in zero position.

Fig. 11 is a vertical section through the multiplier indicating counter.

Fig. 12 is a plan showing the connection of the multiplier index with the carriage.

Figure 1:
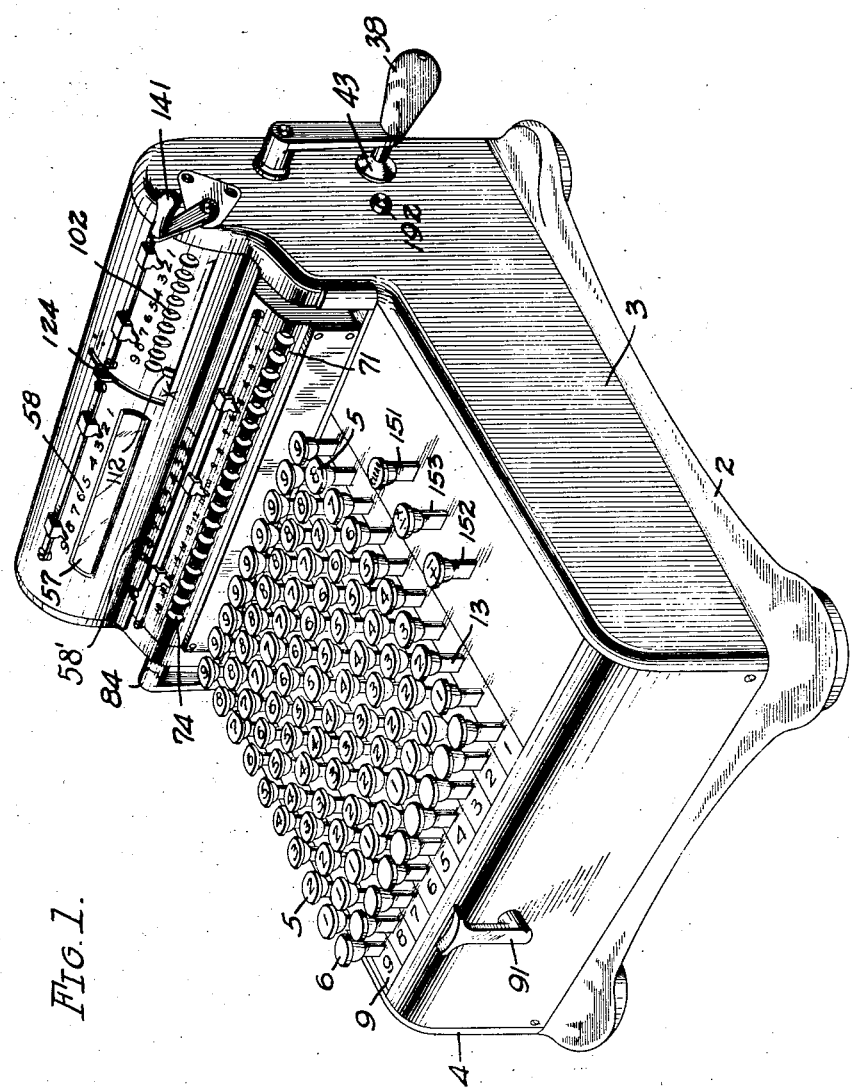
Figure 1 is a perspective view of the machine embodying my invention.

The invention relates to calculating machines of the type embodying keys by which the values are introduced in the machine. Depression of a key, introduces a value corresponding to the numeral on the key, into a rotatable drum within the machine, rotation of the actuator being effected by a handle which projects to the outside of the machine. The values introduced into the actuator are transmitted, on the rotation of the crank handle, to the figure discs of the counting mechanism, which, for the purpose of making the direct action of the selected values on the figure discs of highest value possible, is disposed in parallel displaceable relation to the value selecting mechanism axis.

The calculating machine shown in the drawings, and which embodies the present invention comprises a suitable base 2 having side plates 3—4, between which the selecting and counting mechanism devices are arranged. These devices include a counting mechanism arranged on a longitudinally displaceable carriage, a counting mechanism actuating drum which, upon rotation causes the values entered therein to become effective in operating the counting mechanism, keys for entering the selected values into the drum, an indicator for disclosing the values entered into the drum, an indicator for disclosing the calculation performed or being performed and other devices for controlling the actuation of the keys, selecting mechanism, counting devices and other instrumentalities. The machine contains all of the elements necessary to quickly and accurately perform the operations of addition, subtraction, multiplication and division. The machine is provided with a cover plate disposed between the side plates and arranged on the cover plate are the banks of keys, forming the keyboard. In the present illustration, the machine is provided with nine rows of numeral keys 5, each row comprising nine keys numbered from 1 to 9 consecutively. When a key in a row is depressed, it remains depressed, and each row is provided at its forward end with a clearance key 6, depression of which releases the depressed key in the corresponding row. Extending across the machine, between the side plates 3—4 are fixed cross bars 7 and 8 upon which the key sections are mounted, each section comprising a row of nine keys 5 and one key 6. Each section is formed as a unit and is incorporated in the machine as a unit, and the desired capacity of the machine determines the number of sections to be employed. Each section comprises a top plate or top strip 9, which forms part of the cover plate of the machine. Secured to each top strip adjacent, but spaced from its ends, is a strap 12 which forms a guiding element for the key shanks 13. The keys are normally held in raised positions by springs 14, bearing against the strap 12 and against shoulders 14' on the key shanks. Disposed below and in contact with the under side of the strap 12 is a slide 15 normally held in forward position by the spring 16. The slide is provided with a plurality of apertures through which the key shanks extend and each key shank is provided with a detent 17, which, when the key is depressed, engages under the slide 15, to hold the key in the depressed position. The shank is also provided with a stop 17' which contacts with the plate 9 when the key is raised, to limit the upward movement of the key. The clearance key 6 is provided on its face with a cam projection 18, which operates, on depression of the clearance key, to move the slide to release the depressed key.

Arranged below each key section in position to be contacted with and depressed thereby, is a horizontal bar 21, mounted on links 22, so that as it is depressed, it remains parallel to its normal position. The bar is normally held in its raised position by a spring 23 engaging a link 22. The keys are all depressible through the same distance and are so arranged that depression of a numeral key causes a depression of the bar 21 for a distance corresponding to the numerical value of the depressed key. In the present construction, this is accomplished by making the key shanks of different lengths and spacing the lower ends of the key shanks at progressively varying distances from the bar 21. The shank of the nine key contacts with the bar, the shank of the eight key is spaced a unit distance from the bar, the shank of the seven key is spaced two units distance from the bar and so on, the shank of the one key being spaced eight units distance from the bar. Therefore when the one key is depressed, the bar 21 is moved one unit distance, when the two key is depressed, the bar is moved two units distance and so on. By arranging the bar 21 so that it maintains its parallelism in all positions, the pressures required to depress the keys in a section are substantially the same for all of the keys. This permits the ready actuation of the machine without undue fatigue of the operator.

Mounted on a transverse shaft 25, disposed at the rear of the machine, are a plurality of levers 26, there being one lever 26 for each key section. Each lever 26 is provided with a horizontal arm connected to the end of the bar 21 and with a vertical arm connected with the value selecting element on the counter actuating drum. The horizontal arm is provided with a slot 27 which is engaged by a pin 28 on the bar 21 to permit relative longitudinal movement of the arm and the bar as the bar is depressed by the numeral keys. Depression of the bar through various predetermined distances, causes various angular displacements of the vertical arm 29 of the lever. The vertical arm 29 is provided on its upper end with a rack 31 concentric with the shaft 25, which is in engagement with a gear 32 on the value selecting element. Depression of a key in one section thus causes an angular displacement of the selecting element associated with the section, to a position corresponding to the numeral value of the depressed key. There is a selecting element associated with each key section, in the present instance there being nine selecting elements.

The counting mechanism actuator is mounted on the shaft 33, supported in the side plate 4 and the intermediate plate 34. The actuator comprises nine counting mechanism actuating wheels 35, secured to the shaft 33 and nine value selecting elements 36 loose on the shaft, a wheel 35 and an element 36 being combined to form an actuating unit. The actuator also comprises additional wheels 37 provided with tens carrying pins and selecting element locking means, as will hereafter be described. The actuator is rotatable in either direction from an initial position through a complete revolution back to initial position, by a crank handle 38 extending to the outside of the casing, the crank shaft being provided on its end with a gear 39 meshing with a gear 41 on the actuator shaft. The handle 38 is positioned in initial position by the spring pressed retractile pin 42 attached to the handle and seating in a hollow boss 43 on the casing. By pulling out the handle, the pin is removed from the boss so that the handle may be moved to rotate the actuator.

Each actuating unit comprises a counting mechanism actuating wheel and an associate value selecting element. The actuating wheel comprises a disc or wheel carrying a diametrically disposed slide or member 45, seated in the wheel so that it may be slid diametrically thereof. The slide is provided on one end with an actuating face provided with nine teeth 46, the teeth being arranged on an arc concentric with the axis of the wheel when in projected position and having the same pitch as the teeth of the intermediate wheel of the counting mechanism. The slide is held in the groove in the wheel by the ring 47 secured to the wheel and is normally held in retracted position with the teeth 46 lying within the periphery of the wheel. The function of the selecting element is to project the slide, at the proper time during the rotation of the actuator, to bring the selected number of teeth into engagement with the counting mechanism. The selecting element 36, to one side of which the gear 32 is secured, is provided on its opposite side, that is, the side which lies against the associated actuating wheel, with a cam 48 which is engaged by a roller 49 on the slide 45. The cam 48 is provided with a high face 51 and when the roller is in contact with this face, the slide is held in retracted position, and with a low face 52 and when the roller is in contact with the low face the slide is in projected position. To insure the positive sliding movement of the slide, a backing cam 53, complementary to the main cam, is arranged opposite the low face 52, thus forming a cam groove 54 through which the roller travels as the wheel is rotated, thus insuring the positive sliding motion of the slide, in time with the setting of the selecting element. The slide is thus reciprocated for each rotation of the wheel and the time of its reciprocation with respect to the position of the wheel, is determined by the setting of the selecting element. When the crank handle is rotated in a clockwise direction, the slide is projected as the actuating face is passing the intermediate wheel of the counting mechanism, so that the selected number of teeth engage the counting mechanism and is withdrawn after it passes the counting mechanism. When the handle is rotated in a counterclockwise direction, the slide is projected before it reaches the counting mechanism and is withdrawn as soon as the intermediate wheel has moved the selected number of steps. When the selecting element is set at zero, the slide is projected after the actuating face has passed the counting mechanism, when the handle is rotated clockwise and is projected and withdrawn before the actuating face reaches the counting mechanism, when rotated in the opposite direction.

Means are provided for indicating the values which have been entered into the machine by the depression of the keys, so that it is not necessary for the operator to search over the keyboard to determine the setting of the machine. Each selecting element is provided with a flanged rim section 56 upon which the numerals from zero to 9 are successively delineated and the row of numerals on the successive selecting elements are visible through a window 57 in the casing. When a key in a key section is depressed, the numerical value of the key appears in the window in the position occupied by the particular section. Above the window the casing is provided with numerals 58 corresponding to the positions of the key sections.

The selecting elements are adjustable to selected positions by depression of the keys but are not rotatable with the actuator and means are provided for locking them against rotation upon the initial movement of the crank handle and for preventing the entering of any values into the actuator after the handle has been moved from its initial position. Each selecting element is provided with an arcuate rack 61, normally disposed in the position shown in Fig. 2, and these racks are engageable by fingers 62, to prevent movement of the selecting elements when the actuating handle is out of its initial or normal position. The fingers are mounted on a transverse shaft 63 and are connected together to lock or release all of the selecting elements. Secured to the sleeve to which all of the fingers 62 are secured, is an arm 64 having a rounded end engaging the cam 65 secured to the actuator shaft. The cam is provided with a notch 66 which registers with the end of the arm when the actuating handle is in its initial position and the end of the arm moves into the notch, permitting the fingers to fall by gravity from engagement with the racks 61. Upon the initial movement of the actuating handle the cam 65 causes the arm 64 to be depressed, raising the fingers into engagement with the racks and holding them in such position during the time that the handle is out of initial position. The values entered into the machine by the depression of the keys can therefore not be altered after the handle has been moved.

The calculating machine may be employed to perform operations of addition, subtraction, multiplication and division, a step in any operation being performed by a rotation of the actuating handle. Means are provided for setting the mechanism to automatically clear the key-board after each rotation of the handle, when performing problems of addition or substraction and for causing the values entered on the keyboard to remain unalterable during successive rotations of the handle, when performing the operations of multiplication and division. Secured to the sleeve to which the fingers 62 are secured, is an arm 66' which, when the fingers are disengaged from the racks, lies at the side of the disc 67 secured to the spring pressed rod 68 which extends into the hollow boss 43, in opposition to the spring pressed pin 42. When the operations of multiplication or division are to be performed, the rod 68 is free to move further into the boss 43 when the arm 66' is moved from in front of the disc 67. Upon initial movement of the handle, the fingers 62 and consequently the arm 66' is rocked, locking the selecting elements and raising the arm 66' from alongside the disc 67, so that the rod 68 is free to move. The rod moves sufficiently to place the disc under the end of the arm 66', thus preventing the arm from falling and holding the fingers in engagement with the racks. The handle may then be given any desired number of revolutions without releasing the fingers from the racks. This release is accomplished by positioning the handle in its initial position and permitting the pin 42 to enter the hollow boss 43, pushing back the rod 68 and moving the disc 67 from under the arm 66', permitting the fingers to fall from engagement with the racks by gravity. During the operations of multiplication and division, the key-board is not automatically cleared when the handle is latched in its initial position, but is cleared by the use of a clearance key which will hereafter be described. During the operations of addition and subtraction, the key-board is automatically cleared during the rotation of the handle as will hereinafter be described.

The values entered into the actuator are transferred, upon rotation thereof, to the counting mechanism which is arranged on the longitudinally movable carriage 71, which is movable to permit the action of the actuating elements on the counting wheels of different value. Means are provided for moving the carriage longitudinally either in a step-by-step movement, or continuously to either end of its range of travel. The counting mechanism comprises a plurality of figure discs 72 mounted on the shaft 73 and having figures on their faces visible through apertures 74 in the carriage casing. Each disc is provided on one side with a toothed wheel 75, secured thereto, and meshing with an intermediate toothed wheel 76 loosely mounted on the shaft 77. Upon rotation of the drum, the toothed faces of the actuating elements move into engagement with the intermediate wheels, causing rotation thereof and consequently rotation of the figure discs. The figure discs are prevented from overthrowing by the escapement latches 78 pivoted on the shaft 79, which cause the figure discs to move with a step-by-step movement so that that they are brought to rest between each step, thereby eliminating momentum which would tend to overthrow the disc.

Figure 13:
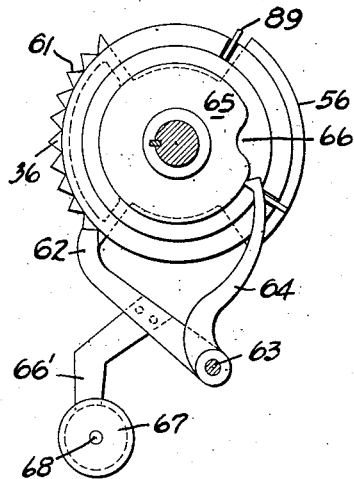
Fig. 13 is a detail showing the control of the selecting element detents.
Figure 14:
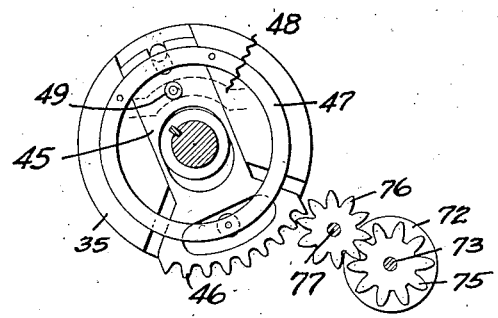
Fig. 14 is a side elevation of a selecting element and its co-operative actuating unit in assembled relation with the counting mechanism.
Figure 15:
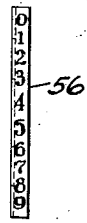
Fig. 15 is a front elevation of a selecting element.
Figure 16:
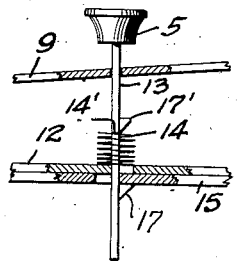
Fig. 16 is a cross section through a key shank, showing the means for holding the key depressed.

These latches are held in latching engagement with the toothed wheels 75, by the spring pressed balls 81 carried by the bar 82. The bar is carried on a shaft 83, which is rotatable to move the balls out of engagement with the latches and thus free the latches, when it is desirable to reset the figure discs to zero. Suitable or well known means may be employed for rotating the figure discs to zero such for instance as is shown in the Trinks Patent No. 1,088,486 of February 24, 1914, by the rotation of the shaft 73, which is provided externally of the carriage with a crank 84. Secured to the shaft 73 is a disc 85 having a notch 86 therein, in which the end of the finger 87 is normally disposed. The finger is secured to the shaft 83 on which the bars 82 are carried, so that upon initial movement of the crank 84, the finger 87 is forced out of the notch 86, turning the bar 82 to release the detent latches. The counting mechanism is also provided with suitable transfer levers 88 which operate in conjunction with the laterally movable tens-carrying pins 89 on the drum Fig. 13, to carry over values from one counting disc to the counting disc of next higher denomination. Transfer levers and tens-carrying pins of the type shown herein are well known in the calculating machine art as shown for instance in the Hamann Patent No. 772,935 of October 25, 1904, so that it is not necessary herein to describe their construction or mode of operation.

Any suitable or well known means may be employed for shifting the carriage longitudinally in a step-by-step movement and for releasing the carriage so that it may be shifted to the end of its travel, and in the drawings I have shown one suitable mechanism for this purpose. The carriage shifting mechanism is operated by movement of the lever 91, arranged at the front of the machine, in one direction or the other, depending upon the desired direction of movement of the carriage. The lever 91 is secured to a shaft 92 journalled in the casing and having its lower end disposed below the carriage. Secured to the inner end of the shaft 92 is a lever 93 having a slot 94 therein which engages a pin 95 on the slide 96 supported in the frame 97. The carriage is mounted on said frame and is provided on its under surface with a plurality of spaced depressions 98 having a spacing equal to the spacing of the numeral discs of the counting mechanism. Mounted in the frame 97 and slidable vertically therein are two upwardly spring pressed dogs 171 and 172 having bevelled upper ends adapted to engage against the sides of the depressions or apertures 98 on the underside of the carriage. The dog 171 bears against the left side wall of a depression, preventing movement of the carriage to the right and the dog 172 bears against the right side wall of another depression, preventing movement of the carriage to the left. The carriage is thus normally locked in position against longitudinal movement and due to the use of two dogs, has no side play. Arranged on each dog is a roller 173 which is engaged by a pivoted dog to depress the latch. Pivoted on the slide 96, adjacent each dog, is a dog 174, which is prevented from moving backward, away from the roller 173 by a stop 175 on the slide. When the slide is moved to move the dog 174 toward the roller, the lower flat inclined surface 176 of the dog 174, rides over the roller, forcing it and its associated sliding dog downward out of contact with the carriage. Pivoted to the slide 96, on the same axis as the dog 174, is a pawl 176', which when released, is forced upward by the spring 177 interposed between the pawl and the dog 174. The pawl extends through an aperture or elongated slot 178 in the top plate 179 of the frame 97 and is normally held out of engagement with the carriage, by contact with the end of the slot. The slot 178 is provided with beveled ends against which the pawls 176' lie, the angle of the bevel corresponding to the slope of the upper surface of the contacting pawl, when the pawl is in normal position as shown in Figure 9. Due to the bevel, the length of the slot on the upper surface of the plate 179 is less than its length on the under face. The length of the slot on the upper face is equal to the distance between the adjacent ends of the pawls 176' when the pawls are in normal position. When the slide 96 is moved toward the left, the right hand dog 174 depresses the dog 172, releasing the carriage so that it may be moved toward the left. Simultaneously, the right hand pawl 176' moves upward into the next depression in the carriage and continued movement of the slide to the left causes the right hand pawl 176' to move the carriage to the left. As the carriage is moving to the left and before it reaches the end of its throw, the right hand dog 174 passes from the roller 173 permitting the dog 172 to spring upward into the next depression in the slide, to the right of the depression from which it was withdrawn, so that the dog is in position to stop the movement of the carriage at the end of its step of movement. On movement of the carriage to the left, the dog 171 is depressed by engagement of the side of the depression with the bevelled side of the dog and springs into the next depression after the carriage has been moved one step. As the slide moves back to its central or neutral position, the right hand dog 174 snaps over the roller 173 to its normal position against the stop 175. Associated with the dog 171 is a corresponding dog 174 and latch 176', together with the other elements, which function is indicated above for movement of the carriage to the right.

Means are provided for returning the slide 96 and the lever 91 to neutral or central position, after the movement of the slide one step in either direction. Supported in the frame 97 below the slide 96 is a rod 181 which extends through an aperture in an ear 182 on the lower side of the slide at substantially the center thereof. Disposed on the rod 181 at each side of the ear 182 is a washer 183 provided with a stud or projection 184, the projections seating in the alined slot 185 and 185' respectively in the frame 97, the slots being of such length that when the studs are positioned at the adjacent ends of the two slots, the ear is held in central or neutral position. Arranged on each end of the rod, between the washer 183 and the abutment 186 through which the rod passes, is a normally inactive spring 187 which tends to hold the washer at the end of the slot. The springs tend to return the slide to neutral or central position, after it has been moved in either direction by the lever 91. Movement of the slide in either direction, compresses the spring on the side toward which the slide is moved, but does not in any manner vary the compression of the other spring, which remains inactive. The slide is thus centered after each movement of the carriage.

Figure 18:
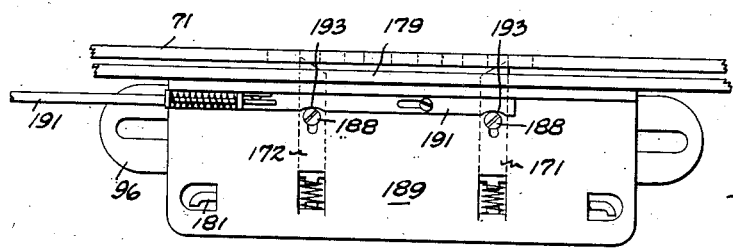
Fig. 18 is a rear view of the carriage shifting device showing the means for releasing the carriage.

Means are also provided for simultaneously releasing or depressing both dogs 171 and 172, so that the carriage may be freely moved by hand. Each dog is provided with a pin 188 Fig. 18 extending through a slot in the rear wall 189 of the frame in which the slide is mounted. Arranged on the rear end of the wall 189 is a slide 191 which is movable longitudinally by pressure on the spring pressed button 192 projecting from the casing. The slide 191 is provided on its under surface with two inclined faces 193 which bear against the pins 188. Movement of the slide causes movement of the inclined surfaces over the pins, causing depression of the dogs and the release of the carriage.

Means are provided for preventing longitudinal movement of the carriage from any step position when the actuator is out of full-cycle position and for preventing rotation of the actuator from full-cycle position when the carriage is out of step position. Secured to the shaft 201 to which the gear 132 is secured and which rotates synchronously with the actuator, is a disc 202 having a notch 203 therein, the sides of which form abutment stops to prevent rotation of the actuator when an abutment is disposed in the notch. When the actuator is in full-cycle position, the notch lies in the position shown in Fig. 2. Secured to the back space of the carriage is a rack or slotted abutment member 204 which cooperates with the disc 202. The slots 205 in the rack are spaced apart the distance of one carriage step and when the carriage is in step position, one of the slots 205 is alined with the disc permitting rotation of the disc. When the carriage is out of step position, an unslotted portion of the rack lies in the notch in the disc, preventing rotation of the disc. Conversely, when the disc is moved from full-cycle position, the un-notched portion of the periphery thereof lies in the slot 205, preventing longitudinal movement of the carriage.

The machine is provided with means for indicating the third factor of the calculation. One factor is indicated by the depression of the keys, the other factor is indicated on the counting mechanism on the carriage and the third factor is indicated independently of the first two. For instance, in the operation of multiplication, the multiplicand is shown at the window 57, the product is shown on the carriage and the multiplier is shown at the windows 102. This third factor is entered into the machine by the rotation of the crank handle 38, which is rotatable in either direction, as has been set forth hereinbefore. The third factor indicating mechanism is mounted between the side plate 3 and the intermediate plate 34 and comprises a counting mechanism consisting of a plurality of numeral wheels 103, each provided on its side with a toothed wheel 104 and meshing intermediate toothed wheels 105. The counting wheels are movable with a step-by-step motion controlled by the spring pressed detents 106. The selected intermediate wheel 105 is rotated one tooth for each revolution of the crank handle by the tooth 107, splined to the shaft 108. The tooth 107 is movable longitudinally of the shaft 108, into the plane of the intermediate wheel of the selected denomination by the longitudinal movement of the carriage, so that the values entered into the third factor are of the same denomination as the values entered into the second factor or product. Surrounding the shaft 108 is a collar 109 to which the tooth member 107 is connected and this collar carries an indicator 112 which indicates the denomination of the numeral being entered into the third factor. Secured to the collar 109 is a rod 113, Fig. 12, provided on its end with a rack 114 which meshes with a gear 115 which, in turn, is in mesh with a rack 116 on the carriage. Movement of the carriage is therefore accompanied by movement of the indicator 112 and the tooth member 107. The indicator moves in the opposite direction to the carriage so that the denominations on the counter wheels 103 progress in increasing value from right to left, as they do in all numbers. Thus, when the carriage is in its extreme left position, in which the value entered by depression of a key in the first key section on the right, is entered into the counter on the carriage as a unit, the indicator is at its extreme right position, that is, at the units counting wheel 103. When the carriage is moved one step to the right from its extreme left position, the value entered by the depression of a key in the first key section on the right, is entered into the counter on the carriage in tens and the indicator is positioned at the tens counting wheel 103.

Figure 5:
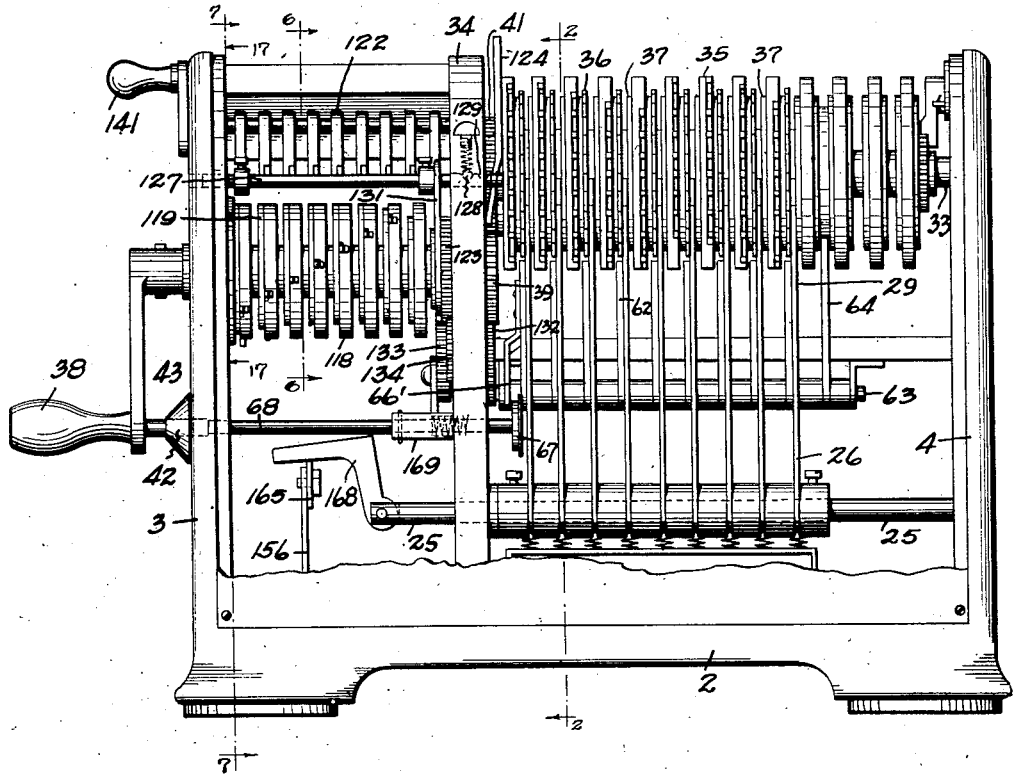
Fig. 5 is a rear elevation of the machine with the case removed.
Figure 17:
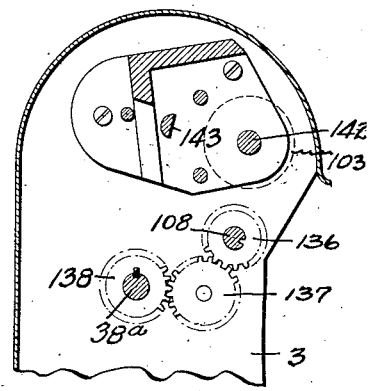
Fig. 17 is a section taken on the line 17—17, Fig. 5.

The shaft 108 is rotated by and in time with the rotation of the crank handle 38, as shown in Fig. 17. Rotatably mounted on the crank shaft 38a is a sleeve 117 on which is secured a tens carrying drum 118 for the counting wheels 103, this drum being provided with cams 119 and the usual laterally movable spring pressed pins 121 which cooperate with the transfer levers 122 of the counting mechanism to carry tens to the counting wheels of next higher denomination. The drum constitutes a universal element, being provided with carry-over pins adapted to cooperate with all of the numeral wheels 103 which are to be advanced as the wheel of the next lower denomination completes a cycle of movement. The pins or carry members 121 indirectly or mediately engage the numeral wheels 103 by engaging the intermediate wheels 105 which are in mesh with the gears 104 on the numeral wheels. Splined to the sleeve 117 is a gear 123 Fig. 7, which is movable longitudinally of the sleeve by a lever 124 projecting through the casing and fulcrumed on the drum shaft. The lever 124 is provided on its inner end with an arm 125 Fig. 8, concentric with the drum shaft and warped or bent laterally. The arm 125 bears in a notch 126 in a longitudinally slidable rod 127 which is normally retained in either of its two positions by a spring pressed ball 128 Fig. 5 adapted to engage in either of the notches 129 in the rod. Secured to the rod 127 is a shifting yoke 131 which engages a collar on the gear 123, so that by shifting the lever 124, the gear 123 is shifted to either of its positions. Journalled in the intermediate plate is a shaft having secured on one end, a gear 132 Fig. 5 meshing with gear 39 and having secured on its other end a gear 133. Meshing with gear 133 and offset to one side thereof is a gear 134. The gear 123 is shiftable sideways so that it is in mesh with either the gear 133 or the gear 134. When the gear 123 is in mesh with gear 133, the drum 118 rotates in the same direction as the crank handle and when the gear 123 is in mesh with gear 134, the drum 118 rotates in the opposite direction to the crank handle. The shaft 108 is connected to the drum 118 by the gears 136, 137 and 138 as shown in Fig. 17, so that the shaft 108 rotates in the same direction as and in time with the rotation of the drum.

By virtue of the provision of the tens carrying mechanism associated with the counting wheels 103, it is possible to perform many calculating operations and obtain correct readings of the dials with a much less number of operations of the crank handle than has heretofore been possible. For instance, when it is desirable to multiply a number for instance, 2345 by 897, it has heretofore been necessary to insert the 2345 into the machine, then, with the carriage in the units position, rotate the crank handle seven times, then move the carriage to the tens position and rotate the crank nine times and then move the carriage to the hundreds position and rotate the crank eight times, making in all, twenty-four rotations of the crank. In the use of my machine, this operation is simplified to an extreme degree. I enter the value 2345 into the key-board and then, with the carriage in the thousands position, I rotate the crank once, thus multiplying by one thousand and showing 1000 on the multiplier dial. I then move the carriage to the units position and rotate the crank three times in the reverse direction, thus subtracting three from one thousand giving and showing a multiplier of 997. I then move the carriage to the hundreds position and rotate the crank once in the reverse direction, producing and displaying a multiplier of 897. The product is thus obtained and the true multiplier displayed by five rotations of the crank in comparison with twenty-four rotations by the prior constructions to secure the same result.

In machines of the prior art, the multiplier register has not been provided with tens-carrying mechanism and in some machines each dial of the multiplier register has been provided with two series of numerals, one series in black and one series in red, whereas in some other machines the dials in the multiplier register are provided with one series of numerals only. In multiplying by 897 in the first type of machine, by five rotations of the crank as set forth above in connection with my machine, the product dial will show 1013, the 10 being in black and the 13 being in red. The operator must then resort to mental arithmetic to satisfy himself that the showing of 1013 in the multiplier dial means that the number has been multiplied by 897. In the second type of machine the five rotations of the crank will display 1097 in the multiplier dial, and the operator must again resort to mental arithmetic. By providing the multiplier register with tens-carrying mechanism, this register will always indicate the true multiplier or divisor and not some number which must be interpreted by mental calculation. The machine is constructed so that the multiplier register actuator 107 and the tens-carrying drum 119 rotate in the same direction and by the operation of the shifting lever 124, the direction of rotation of these two elements may be reversed with respect to the direction of rotation of the main actuator drum. The direction of operation of the machine as a whole is accomplished by control of the direction of rotation of the crank handle 38. The crank handle is rotated in a clockwise direction for performing problems in addition and multiplication and in a counterclockwise direction for problems in subtraction and division. In performing problems in addition and multiplication, the main actuator drum, the multiplier register actuator and the multiplier register tens-carrying drum rotate in the same direction but for problems in division, the lever 124 is shifted so that the multiplier register actuator and the tens-carrying drum rotate in a direction opposite to that of the main actuator drum. In the operation of division, the direction of rotation of the crank handle is reversed but the multiplier register actuator and the tens-carrying drum, must rotate in the same direction as in multiplication, in order that the multiplier register will correctly show the number of times that the divisor has been taken out of the dividend. If the multiplier register actuating elements were not reversed, a single reverse rotation of the crank would display 9999, etc., in the multiplier register, instead of 1. Similarly in subtraction, wherein the direction of rotation of the crank handle is reversed, the multiplier register must operate as in addition, to record and display the number of factors or numerals which have been subtracted.

When the operating crank is turned in a positive direction, as in a multiplication process, the multiplier register actuator control lever 124 is placed in its positive position and for reverse operation of the crank, it is placed in its negative position. In multiplication, however, where the short cut method is employed, as in the example given herein, the lever 124 remains in the positive position for both forward and reverse operations of the crank and vice versa in division. Also in multiplication, when it is desired to produce a complement multiplier in the multiplier register, the lever 124 remains in the negative position for both forward and reverse operations of the crank and vice versa in division. The third factor counter is also advantageously used in determining reciprocals, square root and in problems in division.

Figure 6:
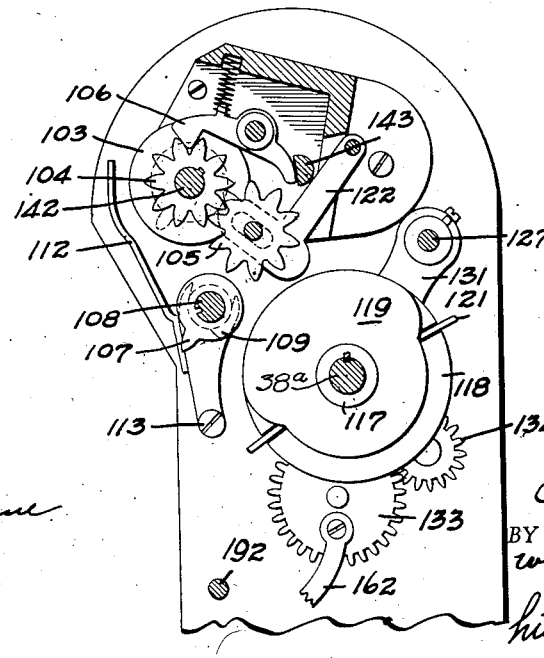
Fig. 6 is a vertical section, on an enlarged scale, taken on the line 6—6, Fig. 5.

The counting wheels 103 are readily reset to zero by rotation of the crank 141 secured to the shaft 142 on which the wheels are rotatably mounted. The wheels are normally held by the spring pressed detents 106. Rotation of the shaft 142, partially rotates a half round shaft 143 Fig. 6, in the same manner as in the counting mechanism in the carriage, to raise the detents from the toothed wheels to permit the counting wheels to readily rotate. The shaft 142 is provided with a cam disc, such as the cam disc 85 on the shaft 73 and the shaft 143 is provided with a finger, such as the finger 87 on the shaft 83, which engages the cam, so that rotation of the shaft 142 causes partial rotation of the shaft 143. A plurality of spring pressed balls 145, in the shaft 142, there being one ball for each counting wheel, engage projections 146 on the inside of the counting wheels and carry them around until a projection or tooth 147 on the side of each wheel contacts with the associated transfer lever 122, stopping the counting wheel in zero position. The transfer lever is held in position to stop the counting wheel, by the cam 119.

Means are provided for clearing the key-board and for setting the machine to perform problems in addition and subtraction, the machine being normally set to perform problems in multiplication and division. Arranged at the side of the key-board are three keys, one key 151 marked "Clear", depression of which clears all inserted values from the key-board; another key 152 marked "±", which when depressed, sets the machine for operations of addition and subtraction, and another key 153 marked

"×"
÷ depression of which releases key 152 and restores the machine to condition for operations of multiplication and division. The slides 15, which serve to hold the depressed numeral keys in depressed position are normally held forward by springs 16 and are provided on their rear ends with lips 154. Pivoted to the frame of the machine, and disposed in front of the lips 154, is a gate or plate 155, which when pushed backward, moves the slides 15 backward, and thus causes the release of the key-shanks. Pivoted within the casing, on a post 156, is a lever 157, one end of which is disposed below the shank of key 151. The other end of the lever is provided with a cam face 158 which lies adjacent the lower end of the gate 155, so that depression of the key 151 rocks the gate 155, thus moving the slides 15 to release all of the depressed numeral keys.

The devices set into operation by the depression of the key 152, which is held in depressed position by the spring pressed slide 159 engaging the projection 161 on the shank of the key, comprise a tripper bar 162 pivoted to the gear 133, so that its free end is reciprocated as the crank handle is rotated. At its free end, the bar is provided with a projection 163, which reciprocates back and forth below the gate 155 and normally out of contact with the gate. The bar is supported intermediate its ends and slides on a lateral projection 164 on the lever 165, pivoted intermediate its ends to the post 156. The front end of the lever 165 lies below the shank of the key 152 so that when said key is depressed, the projection 164 is raised, raising the free end of the bar 162, so that the projection engages and swings the gate 155, at each rotation of the crank handle. The depressed numeral keys are thus released during the rotation of the handle. Means are also provided for releasing the selecting elements on the actuating drum as the handle approaches its initial position after a revolution, and this is accomplished by rendering inoperative the means employed in multiplication operations for holding the selecting elements locked in adjusted positions until the handle pin is seated in the hollow boss. As has been set forth hereinbefore, each selecting element is provided with an arcuate rack 61, which, after the handle is moved from its initial position, is engaged by a finger 62, to prevent movement of the selecting element. The plurality of fingers 62 are moved into engagement with the racks by a cam 65 secured to the drum shaft and co-operating with an arm 64. After the fingers have been raised into engagement with the racks, they are held in such engagement (until the handle pin is reseated in the hollow boss) by the disc 67 on the longitudinally movable rod 68, preventing movement of the arm 66'. When the machine is set to perform operations of addition and subtraction, the rod 68 is held against longitudinal movement, so that the disc 67 cannot move under the arm 68. This permits the cam 65 to solely control the movement of the fingers 62, so that at the end of each rotation of the drum, the fingers are withdrawn and the selecting elements released. The rod 68 is held against longitudinal movement by the angular stop 168, pivoted to the shaft 25 and engaged by the rear end of the lever 165. When the key 152 is depressed, the stop 168 is raised into engagement with an enlargement 169 on the rod 68, thus preventing the rod from moving and consequently preventing the disc 67 from becoming effective to lock the fingers 62 in position. Depression of the key 153 releases the key 152 and causes the parts to return to their normal operative position for performing problems of multiplication and division.

The machine shown in the drawings has nine key sections, nine counting wheels in the multiplier counter and eighteen counting wheels in the carriage counting mechanism, producing a balanced 9—9—18 machine. It is to be understood however, that the machine may be produced in different capacities, such as 12—12—24 or 6—6—12, depending upon the class of service for which it is intended.

I claim:

1. In a calculating machine, a rotatable actuator, a plurality of rows of keys associated with said actuator, slides for holding depressed keys in depressed position, means for moving said slides to release the keys, a gear connected to and rotatable synchronously with said actuator and an arm pivotally connected to said gear and arranged to be reciprocated by rotation of the gear to move said slide moving means to release the depressed keys.

2. In a calculating machine, an actuator, controlling means therefor comprising a plurality of rows of depressible keys, means for holding the depressed keys in depressed position, an indicator associated with each row of keys, a spring associated with each indicator serving to return it from adjusted to zero position, means for holding the indicators in adjusted position determined by the value of the depressed keys and means for locking the indicators in adjusted position during the rotation of the actuator, a clearance key and means operated by the depression of the clearance key while the actuator is in full cycle position for simultaneously releasing the depressed keys and the indicators.

3. In a calculating machine, reversible numeral wheels, an actuator having a single full cycle position rotatable reversibly to introduce positive or negative values into the numeral wheels, said actuator comprising parts adapted to be adjustably positioned to correspond to different values, depressible keys for adjustably positioning said parts, means for holding the depressed keys in depressed position, means for continuously holding and locking the adjustably positioned parts in adjusted position, means for rotating the actuator in either direction from full cycle position, means operative during the rotation of the actuator for releasing the depressed keys and means operative upon the stopping of the actuator in full cycle position for releasing the adjustably positioned parts of the actuator.

4. In a calculating machine, a counting mechanism, a rotatable element, a slide carried by said rotatable element provided on its end with a plurality of teeth adapted to cooperate with said counting mechanism on rotation of said element, key set means inseparably associated with said rotatable element operative during the rotation of said element for causing a predetermined number of said teeth to engage the counting mechanism, means tending to return the key set means to zero position, means for latching the key set means in adjusted position and means operative in time with the rotatable element for releasing the latching means.

5. In a calculating machine, differential actuating mechanism comprising differentially settable control members spring urged toward zero position, key set differential mechanism for positioning and retaining said members against the action of said spring, and means controlled by the operation of said actuating mechanism for retaining said members in set position to permit release of said keys.

6. In a calculating machine, differential actuating mechanism comprising differentially settable control members, key set differential mechanism comprising key latches for positioning and retaining said members in selected adjustments, means for locking said members in the said selected adjustments, and a common control for operating said lock and said key latches seriatim.

7. In a calculating machine, differential actuating mechanism comprising differentially settable control members, key set differential mechanism comprising key latches, for positioning and retaining said members in selected adjustments, means for locking said members in the said selected adjustments and reversibly operable means for controlling said lock and said key latches seriatim, but in the same order regardless of the direction of operation thereof.

8. In a calculating machine, differential actuating mechanism comprising settable control members, key set differential mechanism comprising key latches which controls the setting of said members, means for locking said members in selected adjustments during a plurality of operations of said actuating mechanism, and means for controlling said lock and said key latches seriatim.

CARL M. F. FRIDEN.